(12) United States Patent
Kawata et al.

(10) Patent No.: US 7,585,800 B2
(45) Date of Patent: Sep. 8, 2009

(54) SILICA GLASS AND OPTICAL MATERIAL

(75) Inventors: Mitsuhiro Kawata, Tokyo (JP); Akira Takada, Tokyo (JP); Hideaki Hayashi, Tokyo (JP); Naoki Sugimoto, Tokyo (JP); Shinya Kikugawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/962,936

(22) Filed: Dec. 21, 2007

(65) Prior Publication Data
US 2008/0103038 A1    May 1, 2008

Related U.S. Application Data

(63) Continuation of application No. PCT/JP2006/318543, filed on Sep. 13, 2006.

(30) Foreign Application Priority Data

| Sep. 16, 2005 | (JP) | ............................... 2005-269578 |
| Dec. 27, 2005 | (JP) | ............................... 2005-375010 |
| Feb. 8, 2006 | (JP) | ............................... 2006-031021 |

(51) Int. Cl.
*C03C 3/06* (2006.01)
*C03B 20/00* (2006.01)
*H05B 33/10* (2006.01)

(52) U.S. Cl. ............................... 501/54; 501/55; 65/61; 359/250; 422/82.05

(58) Field of Classification Search .................. 501/54, 501/55; 359/250; 422/82.05; 65/61
See application file for complete search history.

(56) References Cited

U.S. PATENT DOCUMENTS

| 3,810,744 | A | * | 5/1974 | Dumbaugh, Jr. et al. | ........ 65/42 |
| 6,399,527 | B1 | * | 6/2002 | Kishimoto et al. | ............. 501/69 |
| 6,442,975 | B1 | * | 9/2002 | Murakami et al. | .............. 65/61 |
| 2002/0018942 | A1 | | 2/2002 | Brown et al. | |
| 2002/0110743 | A1 | * | 8/2002 | Shoki et al. | .................... 430/5 |
| 2004/0250573 | A1 | * | 12/2004 | Hack et al. | .................... 65/17.4 |
| 2005/0245383 | A1 | * | 11/2005 | Iwahashi et al. | ............... 501/54 |
| 2005/0272590 | A1 | * | 12/2005 | Iwahashi et al. | ............... 501/55 |
| 2006/0019815 | A1 | * | 1/2006 | Inoue et al. | .................... 501/72 |
| 2006/0135341 | A1 | * | 6/2006 | Ellison et al. | .................. 501/4 |
| 2006/0179879 | A1 | * | 8/2006 | Ellison et al. | ................. 65/17.4 |

FOREIGN PATENT DOCUMENTS

| DE | 103 49 648 | | 5/2005 |
| GB | 1 459 178 | | 12/1976 |
| JP | 11100230 | A * | 4/1999 |
| JP | 2005-22954 | | 1/2005 |
| WO | WO 98/00372 | | 1/1998 |
| WO | WO 2004/089838 | | 10/2004 |

OTHER PUBLICATIONS

Anedda et al, Journal of Non-Crystalline Solids, (2001), 208, pp. 287-291.
Brambilla et al, Fiber and Integrated Optics, (2001), 20(6), pp. 553-564.
Chiodini et al, Applied Physics Letters, (2002), 81(9), pp. 1702-1704.
Paleari et al, Journal of Non-Crystalline Solids, (2004), 345 & 346, pp. 306-310.
Chiodini et al, J. Mater. Chem., (2001), 11, pp. 926-929.
Nakanishi et al, Journal of Non-Crystalline Solids, (2003), 318, pp. 87-94.
Sears et al, Phys. Chem. Glasses, (2000), 41(1), pp. 42-48.

* cited by examiner

*Primary Examiner*—Anthony J Green
(74) *Attorney, Agent, or Firm*—Oblon, Spivak, McClelland, Maier & Neustadt, P.C.

(57) ABSTRACT

It is to obtain a silica glass suitable as a material for an optical material constituting an optical system to be used for EUVL, which has a low coefficient of thermal expansion from 0 to 100° C., and on which formation of concave defects is suppressed in a polishing step to achieve a high level of flatness.

A silica glass containing from 0.1 to 10 mass % of Sn calculated as $SnO_2$ and from 3 to 10 mass % of Ti calculated as $TiO_2$, which has a homogeneity of the coefficient of thermal expansion from 0 to 100° C. to the temperature of from 50 to 200 ppb/° C., a coefficient of thermal expansion from 0 to 100° C. of 0±250 ppb/° C., and a Vickers hardness of at most 650.

8 Claims, No Drawings

SILICA GLASS AND OPTICAL MATERIAL

TECHNICAL FIELD

The present invention relates to a silica glass containing $SnO_2$ and $TiO_2$ (hereinafter referred to as $SnO_2$—$TiO_2$—$SiO_2$ glass in this specification). Particularly, it relates to a $SnO_2$—$TiO_2$—$SiO_2$ glass used as an optical material constituting an optical system to be used in EUV lithography. Here, in the present invention, EUV (Extreme Ultra Violet) light means a light having a wavelength in the soft X-ray region or in the vacuum ultraviolet region, and specifically, it is a light having a wavelength at a level of from 0.2 to 100 nm.

BACKGROUND ART

In recent years, in photolithography, along with high integration and high functionality of integrated circuits, microsizing of integrated circuit has been progressing. Accordingly, an exposure device is required to form an image of a circuit pattern on a wafer with a high resolution with a long focal depth, and blue shift of the exposure light source is in progress. The exposure light source has been advanced from the conventional g-line (wavelength: 436 nm), i-line (wavelength: 365 nm) or KrF excimer laser (wavelength: 248 nm), and now an ArF excimer laser (wavelength: 193 nm) is being used. Further, in order to be prepared for an integrated circuit for the next generation where the line width of a circuit pattern will be less than 100 nm, an immersion technique for an exposure system for ArF excimer laser, or a technique for employing a $F_2$ laser (wavelength: 157 nm) as the exposure light source, is being developed. But, it is considered that even these techniques can not cover beyond a generation of a line width of 45 nm.

Under these circumstances, a lithographic technique employing a light having a wavelength of 13.5 nm as a representative example among EUV light (extreme ultraviolet light) as the exposure light source, has attracted attention, as it may be applied to multiple generations of the printing of feature widths of 45 nm and smaller. The image-forming principle of the EUV lithography (hereinafter referred to as "EUVL") is the same as the conventional photolithography to such an extent that a mask pattern is transferred by means of an optical projection system. However, in the energy region of EUV light, there is no material to let the light pass therethrough. Accordingly, a transmissive optical system can not be used, and all optical systems will be required to be a reflective optical system.

The optical material for the exposure device to be used for EUVL is basically constituted by (1) a substrate, (2) a reflective multilayer film coated on the substrate and (3) an absorber layer formed on the reflective multilayer film. For the multilayer film, it is studied to coat layers of Mo/Si alternately. For the absorber layer, it is studied to use Ta or Cr as the layer-forming material. With regard to the substrate, a material having a low coefficient of thermal expansion is required so that expansion of substrate caused by heat generated by absorption of light will cause no strain even under irradiation with EUV light. In addition, a substrate to be used for EUVL is required to have strict flatness and few defects as compared with a silica glass used for conventional photolithography.

In conventional photolithographic technique employing a transmissive optical system, a silica glass known to have a low coefficient of thermal expansion is used as a substrate. However, the coefficient of thermal expansion (CTE) of the silica glass is high for the optical material for an exposure device to be used for EUVL, and the strain is not negligible under irradiation with EUV light.

On the other hand, a silica glass containing $TiO_2$ (hereinafter referred to as $TiO_2$—$SiO_2$ glass in this specification) is known to be an ultra low thermal expansion material having a coefficient of thermal expansion lower than silica glass. In addition, the coefficient of thermal expansion can be controlled by the $TiO_2$ content in the glass. Therefore, with such $TiO_2$—$SiO_2$ glass, it is possible to obtain a zero expansion glass having a coefficient of thermal expansion being close to zero. Accordingly, $TiO_2$—$SiO_2$ glass is a candidate for an optical material for an exposure device to be used for EUVL.

JP-A-2005-22954 discloses a process of forming a $TiO_2$—$SiO_2$ porous glass body, converting it into a glass body and then obtaining a mask substrate.

DISCLOSURE OF THE INVENTION

Object to be Accomplished by the Invention

With conventional $TiO_2$—$SiO_2$ glass, due to dependence of the coefficient of thermal expansion on the temperature, the temperature region in which the coefficient of the thermal expansion is almost zero, has been limited to the vicinity of room temperature. Further, with conventional $TiO_2$—$SiO_2$ glass, concave defects such as pits or scratches may be formed in some cases in a polishing step to achieve a high level of flatness.

During the deposition to coat a reflection film or the like, the temperature of the optical material for an exposure device for EUVL becomes about 100° C. Further, during the exposure, the optical material will be irradiated with high energy rays, and the temperature of the optical material is likely to locally rise. Accordingly, such an optical material for an exposure device for EUVL preferably has not only a small coefficient of thermal expansion but also low dependence of the coefficient of thermal expansion on the temperature. However, a conventional silica glass has a high coefficient of thermal expansion and is insufficient for use as an optical material for an exposure device for EUVL. Further, a $TiO_2$—$SiO_2$ glass has an ultra low coefficient of thermal expansion, but will have concave defects such as pits or scratches in the polishing step and is thereby insufficient for use as an optical material for an exposure device for EUVL. Formation of concave defects in the polishing step is considered to be related with the Vickers hardness of the glass, in a case where polishing is carried out mainly by mechanical effects.

Under these circumstances, it is an object of the present invention to provide an optical member for exposure suitable for EUVL, having a low coefficient of thermal expansion, having low dependence of the coefficient of thermal expansion on the temperature and having an appropriate Vickers hardness.

Means to Accomplish the Object

Embodiment 1 of the present invention provides a silica glass containing from 0.1 to 10 mass % of Sn calculated as $SnO_2$ and from 3 to 10 mass % of Ti calculated as $TiO_2$.

Embodiment 2 of the present invention provides the silica glass according to Embodiment 1, which has a fluctuation of the coefficient of thermal expansion from to 100° C. to the temperature of from 50 to 200 ppb/° C., and a coefficient of thermal expansion from 0 to 100° C. of 0±250 ppb/° C.

Embodiment 3 of the present invention provides the silica glass according to Embodiment 1 or 2, which has a Vickers hardness of at most 650.

Embodiment 4 of the present invention provides an optical member constituting an optical system to be used for EUVL, which comprises the silica glass as defined in Embodiment 1, 2 or 3.

Embodiment 5 of the present invention provides a is glass substrate comprising the silica glass as defined in Embodiment 1, 2 or 3.

Embodiment 6 of the present invention provides the glass substrate according to Embodiment 5, which has a processed surface.

Embodiment 7 of the present invention provides the glass substrate according to Embodiment 6, wherein the processed surface is processed by a procedure containing a polishing step using abrasive grains.

According to the present invention, $SnO_2$—$TiO_2$—$SiO_2$ glass having a lower coefficient of thermal expansion than a silica glass can be provided. In addition, the $SnO_2$—$TiO_2$—$SiO_2$ glass has a Vickers hardness lower than a conventional $TiO_2$—$SiO_2$ glass and is thereby suitable as a material of an optical member constituting an optical system to be used for EUVL.

BEST MODE FOR CARRYING OUT THE INVENTION

The $SnO_2$—$TiO_2$—$SiO_2$ glass of the present invention is preferably a silica glass containing from 0.1 to 10 mass % of Sn calculated as $SnO_2$ and from 3 to 10 mass % of Ti calculated as $TiO_2$. If the Sn content is less than 0.1 mass %, the coefficient of thermal expansion is not sufficiently low as compared with the silica glass. It is preferably at least 0.3 mass %, particularly preferably at least 0.5 mass %. Further, if it exceeds 10 mass %, $SnO_2$ crystals may be precipitated in the $SnO_2$—$TiO_2$—$SiO_2$ glass, and no homogeneous $SnO_2$—$TiO_2$—$SiO_2$ glass may be obtained. It is preferably at most 5 mass %, particularly preferably at most 3 mass %.

If the Ti content is less than 3 mass %, the coefficient of thermal expansion may not sufficiently be low as compared with the silica glass. Further, if it exceeds 10 mass %, there is possibility of the coefficient of thermal expansion being negative. The Ti content is more preferably from 3 to 7 mass %, particularly preferably from 3 to 5 mass %.

The reason why the coefficient of thermal expansion of the $SnO_2$—$TiO_2$—$SiO_2$ glass of the present invention is low is estimated as follows. A silica glass is formed by a tetrahedral structure similar to quartz, Si is stably present with tetravalent and four-fold coordination. Whereas, $SnO_2$ crystals and $TiO_2$ crystals have a rutile structure, and Sn and Ti are stably present with tetravalent and six-fold coordination. Here, assuming that $SnO_2$ crystals and $TiO_2$ crystals with quartz structure, in which Sn and Ti are present with tetravalent and four-fold coordination in a simulation, their volume changes were calculated. As a result, the volume of $SnO_2$ crystals and $TiO_2$ crystals with quartz structure decreased with increase in temperature. It is estimated that such a phenomenon occurs due to an increase in density by the change in coordination number of Sn and Ti from four to six, which makes their structures close to the rutile structure from the quartz structure. Accordingly, it is considered that the coefficient of thermal expansion can be made low by incorporation of Sn and Ti in the silica glass.

The $SnO_2$—$TiO_2$—$SiO_2$ glass of the present invention has a fluctuation of the coefficient of thermal expansion from 0 to 100° C. to the temperature of preferably from 50 to 200 ppb/° C., particularly preferably from 50 to 150 ppb/° C.

The $SnO_2$—$TiO_2$—$SiO_2$ glass of the present invention has a coefficient of thermal expansion from 0 to 100° C. of preferably 0±250 ppb/° C. It is more preferably 0±200 ppb/° C., furthermore preferably 0±150 ppb/° C., particularly preferably 0±100 ppb/° C.

The Vickers hardness of the $SnO_2$—$TiO_2$—$SiO_2$ glass of the present invention is preferably at most 650. It is considered that formation of concave defects such as pits or scratches in the polishing step to achieve a high level of flatness can be suppressed by such a Vickers hardness. Further, the polishing rate will be high, whereby polishing will be easily carried out efficiently in a short time to achieve a high level of flatness.

The reason why formation of concave defects such as pits or scratches in the polishing step is suppressed by lowering the Vickers hardness is considered as follows. Chemical durability (acid resistance, water resistance) of the $TiO_2$—$SiO_2$ glass is very high as compared with common aluminosilicate glass or soda lime glass. Thus, it is considered that in the polishing step, mechanical effects will be strongly exerted, and polishing will be in progress by microdestruction phenomenon by abrasive grains. In such a case, a glass having a high Vickers hardness has strong resistance to microdestruction, whereby the abrasive grains will form concave defects. Therefore, it is considered that formation of concave defects can be suppressed by lowering the Vickers hardness.

The content of OH groups in the $SnO_2$—$TiO_2$—$SiO_2$ glass of the present invention is preferably at most 600 ppm, particularly preferably at most 200 ppm as represented by mass, whereby the temperature dependence of the coefficient of thermal expansion can be further reduced, and a glass having a low coefficient of thermal expansion in a wide temperature range can be obtained.

For production of the $SnO_2$—$TiO_2$—$SiO_2$ glass of the present invention, the following soot method may be employed.

Now, production of the $SnO_2$—$TiO_2$—$SiO_2$ glass of the present invention by a soot method will be described below. As the soot method, MCVD method, OVD method, VAD method, etc. may be mentioned depending upon the manner of preparation.

For example, the following steps may be employed.

Step (a)

$SnO_2$—$TiO_2$—$SiO_2$ glass fine particles obtained by flame hydrolysis of a Sn precursor, a Ti precursor and a Si precursor as glass-forming materials, are deposited and grown on a target to obtain a porous $SnO_2$—$TiO_2$—$SiO_2$ glass body.

The glass-forming materials are not particularly limited so long as they are materials capable of being gasified. The Sn precursor may, for example, be a tin halide compound such as $SnCl_4$ or $SnBr_4$, or a tin alkoxide represented by $R_nSn(OR)_{4-n}$ (wherein R is a $C_{1-4}$ alkyl group, and n is an integer of from 0 to 3).

The Ti precursor may, for example, be a titanium halide compound such as $TiCl_4$ or $TiBr_4$ or a titanium alkoxide represented by $R_nTi(OR)_{4-n}$ (wherein R is a $C_{1-4}$ alkyl group, and n is an integer of from 0 to 3).

The Si precursor may, for example, be a silicon halide compound such as a chloride such as $SiCl_4$, $SiHCl_3$, $SiH_2Cl_2$ or $SiH_3Cl$, a fluoride such as $SiF_4$, $SiHF_3$ or $SiH_2F_2$, a bromide such as $SiBr_4$ or $SiHBr_3$ or an iodide such as $SiI_4$, or an alkoxysilane represented by $R_nSi(OR)_{4-n}$ (wherein R is a $C_{1-4}$ alkyl group, and n is an integer of from 0 to 3).

Further, as the Si precursor and the Sn precursor, a compound of Si and Sn such as a silicon-tin double alkoxide, may also be used.

Further, as the Si precursor and the Ti precursor, a compound of Si and Ti such as a silicon-titanium double alkoxide, may also be used.

As the above target, a target made of quartz glass (such as a target disclosed in JP-B-63-24973) may be used. The target may not be limited to a rod shape and a plate-shaped target may also be employed.

Step (b)

The porous $SnO_2$—$TiO_2$—$SiO_2$ glass body obtained in Step (a) is heated to a vitrification temperature for vitrification to obtain a transparent $SnO_2$—$TiO_2$—$SiO_2$ glass body. The vitrification temperature is a temperature at which the porous glass body can be densified to such an extent that void spaces can no longer be detected by an optical microscope, and it is usually preferably from 1,400 to 1,700° C., particularly preferably from 1,450 to 1,650° C. Further, the time is preferably from about 4 hours to about 20 hours.

The atmosphere is preferably an atmosphere of 100% inert gas such as helium or an atmosphere containing an inert gas such as helium, as the main component. The pressure may be reduced pressure or normal pressure. Particularly in the case of normal pressure, a helium gas may be used. Further, in the case of reduced pressure, preferred is at most 13,000 Pa. Here, in this specification "Pa" means the absolute pressure, not the gauge pressure.

Further, by carrying out the following Step (a)-1 between Steps (a) and (b), it is possible to easily control the OH group concentration in the transparent $SnO_2$—$TiO_2$—$SiO_2$ glass to be obtained in Step (b).

Step (a)-1: The porous $SnO_2$—$TiO_2$—$SiO_2$ glass body is held in an atmosphere containing halogen such as chlorine or fluorine at room temperature or at a temperature of at most the vitrification temperature for from several dozen minutes to several dozen hours, thereby to reduce the OH group concentration in the porous $SnO_2$—$TiO_2$—$SiO_2$ glass body.

Step (c)

The $SnO_2$—$TiO_2$—$SiO_2$ glass body obtained in Step (b) is heated to a temperature of at least the softening temperature and formed into a desired shape, thereby to obtain a formed $SnO_2$—$TiO_2$—$SiO_2$ glass body. The temperature at the forming step is preferably from 1,500 to 1,800° C. If it is lower than 1,500° C., no substantial self-weight transformation occurs, since the viscosity of the $SnO_2$—$TiO_2$—$SiO_2$ glass is high. If the temperature exceeds 1,800° C., sublimation of $SiO_2$ is not negligible.

Step (d)

The formed $SnO_2$—$TiO_2$—$SiO_2$ glass body obtained in Step (c) is held at a temperature exceeding 500° C., for example, at a temperature of from 600 to 1,200° C. for at least 5 hours. Then, annealing treatment is carried out by lowering the temperature to not higher than 500° C. at an average cooling rate of at most 10° C./hr, to reduce the strain in the glass body. After lowering the temperature to not higher than 500° C., the glass body may be left to cool naturally. In such a case, the glass body is left to cool preferably in an atmosphere of 100% inert gas such as helium, argon or nitrogen, in an atmosphere containing such an inert gas as the main component or in the air atmosphere under reduced pressure or normal pressure.

The $SnO_2$—$TiO_2$—$SiO_2$ glass body obtained in the above step is processed into a predetermined shape, and the glass surface is polished by abrasive grains to obtain a $SnO_2$—$TiO_2$—$SiO_2$ glass substrate. As the abrasive grains, colloidal silica, cerium oxide, aluminum oxide, silicon carbide or boron carbide may be used.

The glass substrate polished by abrasive grains may further be subjected to finishing by ion beam etching, glass cluster ion beam etching, plasma etching, nano abrasion or MRF (magnetorheological finishing).

The $SnO_2$—$TiO_2$—$SiO_2$ glass obtained by the present invention is suitable as a glass substrate for a mask to be used for EUVL, and as an optical member, such as a mirror substrate or a stage, to be used for a semiconductor exposure apparatus.

Now, the present invention will be described in further detail with reference to Examples. However, it should be understood that the present invention is by no means thereby restricted. Examples 1 and 2 are Examples of the present invention, and Examples 3, 4, 5 and 6 are Comparative Examples.

EXAMPLE 1

$SnO_2$—$TiO_2$—$SiO_2$ glass fine particles (soot) obtained by gasifying $SnCl_4$, $TiCl_4$ and $SiCl_4$ as glass-forming materials for $SnO_2$—$TiO_2$—$SiO_2$ glass, respectively, then mixing them and feeding them in oxyhydrogen flame to heat hydrolyze (flame hydrolysis), were deposited and grown on a target, to form a porous $SnO_2$—$TiO_2$—$SiO_2$ glass body having a diameter of about 80 mm and a length of about 100 mm. In the process of forming the porous $SnO_2$—$TiO_2$—$SiO_2$ glass body, the feed rates of $SnCl_4$, $TiCl_4$ and $SiCl_4$ into oxyhydrogen flame were $2.66 \times 10^{-2}$ g/min, $6.03 \times 10^{-2}$ g/min and 1.13 g/min, respectively. The obtained porous $SnO_2$—$TiO_2$—$SiO_2$ glass body was difficult to handle as porous glass body, and accordingly, it was held in the air at 1,200° C. for 4 hours as deposited on the target, and then removed from the target (Step (a)).

Then, it was heated in a 100% helium gas atmosphere to 1,450° C. and held at this temperature for 4 hours (Step (b)).

Then, the glass body was heated in a 100% argon gas atmosphere to 1,700° C. and held at this temperature for 4 hours to obtain a transparent $SnO_2$—$TiO_2$—$SiO_2$ glass (Step (c)).

EXAMPLE 2

A $SnO_2$—$TiO_2$—$SiO_2$ glass was obtained in the same manner as in Example 1 except that in Step (a), $SnO_2$—$TiO_2$—$SiO_2$ glass fine particles (soot) were deposited and grown on a target with a feed rate of $TiCl_4$ in oxyhydrogen flame of $3.79 \times 10^{-2}$ g/min.

EXAMPLE 3

A $SnO_2$—$TiO_2$—$SiO_2$ glass was obtained in the same manner as in Example 1 except that in Step (a), $SnO_2$—$TiO_2$—$SiO_2$ glass fine particles (soot) were deposited and grown on a target with a feed rate of $TiCl_4$ in oxyhydrogen flame of $2.07 \times 10^{-2}$ g/min.

EXAMPLE 4

A $SnO_2$—$TiO_2$—$SiO_2$ glass was obtained in the same manner as in Example 1 except that in Step (a), $SnO_2$—$TiO_2$—$SiO_2$ glass fine particles (soot) were deposited and grown on a target with a feed rate of $TiCl_4$ in oxyhydrogen flame of $8.16 \times 10^{-3}$ g/min.

EXAMPLE 5

$TiO_2$—$SiO_2$ glass fine particles (soot) obtained by gasifying $TiCl_4$ and $SiCl_4$ as glass-forming materials for $TiO_2$—$SiO_2$ glass, respectively, then mixing them and feeding them in oxyhydrogen flame to heat hydrolyze (flame hydrolysis), were deposited and grown on a target, to form a porous TiO$_2$—SiO$_2$ glass body having a diameter of about 80 mm and a length of about 100 mm. The obtained porous TiO$_2$—SiO$_2$ glass body was difficult to handle as porous glass body, and accordingly, it was held in the air at 1,200° C. for 4 hours as deposited on the target, and then removed from the target. The glass body is was heated in a 100% helium gas atmosphere to 1,450° C. and held at this temperature for 4 hours. Then, the glass body was heated in a 100% argon gas atmosphere to 1,680° C. and held at this temperature for 4 hours to obtain a transparent TiO$_2$—SiO$_2$ glass.

EXAMPLE 6

Gas of SiCl$_4$ was fed in oxyhydrogen flame to heat hydrolyze (flame hydrolysis), to prepare a porous silica glass body having a bulk density of 0.3 g/cm$^3$. This glass body was heated in a 100% helium gas atmosphere to 1,450° C. and held at this temperature for 4 hours to obtain a transparent silica glass.

Evaluation Method

Evaluation was carried out in accordance with the following method. The coefficient of thermal expansion was measured within a range of from −150 to 200° C. by using a thermodilatometer based on laser interference (thermodilatometer LIX-1, manufactured by ULVAC-RIKO, Inc.). The Sn content calculated as SnO$_2$ and the Ti content calculated as TiO$_2$ in the SnO$_2$—TiO$_2$—SiO$_2$ glass were obtained by non standard FP analysis method using fluorescent X-rays. The Vickers hardness was measured by using a microhardness tester (microhardness tester MVK-H2, manufactured by Akashi Corporation) at a load of 100 g with a load time of 15 seconds.

Evaluation results are shown in Table 1.

TABLE 1

| Ex. | SnO$_2$ content (mass %) | TiO$_2$ content (mass %) | Coefficient of thermal expansion from 0 to 100° C. (ppb/° C.) | Fluctuation of coefficient of thermal expansion from 0 to 100° C. (ppb/° C.) | Vickers hardness |
|---|---|---|---|---|---|
| Ex. 1 | 0.53 | 7.2 | −71 to 103 | 174 | 637 |
| Ex. 2 | 0.45 | 4.7 | 85 to 249 | 164 | — |
| Ex. 3 | 0.42 | 2.7 | 198 to 376 | 178 | — |
| Ex. 4 | 0.34 | 1.0 | 314 to 464 | 150 | — |
| Ex. 5 | 0 | 6.5 | −76 to 82 | 158 | 695 |
| Ex. 6 | 0 | 0 | 416 to 531 | 115 | 812 |

In Examples 1 and 2, the coefficient of thermal expansion from 0 to 100° C. is lower than the value in Example 6. Further, the Vickers hardness is lower than the value in Example 5, whereby it is considered that concave defects such as pits or scratches are less likely to form when polishing is carried out to achieve a high level of flatness under the same conditions. In Examples 3 and 4, the TiO$_2$ concentration is low, and the coefficient of thermal expansion from 0 to 100° C. is not sufficiently low as compared with Example 1. In Example 5, the coefficient of thermal expansion from 0 to 100° C. is sufficiently small as compared with the value in Example 6, but the Vickers hardness is high as compared with the value in Example 1, whereby defects such as pits or scratches may form when polishing is carried out to achieve a high level of flatness.

INDUSTRIAL APPLICABILITY

The SnO$_2$—TiO$_2$—SiO$_2$ glass obtained by the present invention is suitable as an optical material for a semiconductor exposure apparatus such as a mask substrate to be used for EUVL and an optical member such as a mirror substrate or a stage for a semiconductor exposure apparatus.

The entire disclosures of Japanese Patent Application No. 2005-269578 filed on Sep. 16, 2005, Japanese Patent Application No. 2005-375010 filed on Dec. 27, 2005 and Japanese Patent Application No. 2006-031021 filed on Feb. 8, 2006 including specifications, claims and summaries are incorporated herein by reference in their entireties.

What is claimed is:

1. An optical material, comprising a silica glass containing from 0.1 to 10 mass % of Sn calculated as SnO$_2$ and from 3 to 10 mass % of Ti calculated as TiO$_2$, wherein the silica glass has a processed surface obtained by a procedure containing a polishing step using abrasive grains,
    wherein the silica glass has a fluctuation of the coefficient of thermal expansion from 0 to 100° C. to the temperature of from 50 to 200 ppb/° C., and a coefficient of thermal expansion from 0 to 100° C. of 0±250 ppb/° C.

2. The optical material of claim 1, wherein the silica glass has a Vickers hardness of at most 650.

3. The optical material of claim 1, wherein the silica glass contains from 0.1 to 5 mass % of Sn calculated as SnO$_2$.

4. The optical material of claim 1, wherein the silica glass contains from 0.1 to 3 mass % of Sn calculated as SnO$_2$.

5. The optical material of claim 1, wherein the silica glass contains from 3 to 7 mass % of Ti calculated as TiO$_2$.

6. The optical material of claim 1, wherein the silica glass contains from 3 to 5 mass % of Ti calculated as TiO$_2$.

7. The optical material of claim 1, wherein the silica glass has a fluctuation of the coefficient of thermal expansion from 0 to 100° C. to the temperature of from 50 to 150 ppb/° C., and a coefficient of thermal expansion from 0 to 100 ° C. of 0±200 ppb/° C.

8. An optical member constituting an optical system to be used for EUVL, which comprises the optical material as defined in claim 1.

* * * * *